United States Patent
Takahashi et al.

(10) Patent No.: US 8,049,154 B2
(45) Date of Patent: *Nov. 1, 2011

(54) RADIATION DETECTOR WITH AL2O3 SUBSTRATE AND RADIATION DETECTION METHOD

(75) Inventors: Kohei Takahashi, Osaka (JP); Tsutomu Kanno, Kyoto (JP); Akihrio Sakai, Osaka (JP); Hideaki Adachi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/919,379

(22) PCT Filed: Dec. 2, 2009

(86) PCT No.: PCT/JP2009/006564
§ 371 (c)(1),
(2), (4) Date: Aug. 25, 2010

(87) PCT Pub. No.: WO2010/095199
PCT Pub. Date: Aug. 26, 2010

(65) Prior Publication Data
US 2011/0024604 A1    Feb. 3, 2011

(30) Foreign Application Priority Data
Feb. 20, 2009  (JP) .................. 2009-037490

(51) Int. Cl.
*H01L 27/00* (2006.01)
*H01L 27/14* (2006.01)
*H01L 21/00* (2006.01)

(52) U.S. Cl. ................ 250/208.1; 257/431; 438/57

(58) Field of Classification Search ............. 250/208.1; 136/200, 201, 213, 230, 236.1, 237–241, 136/243, 244, 252, 265; 257/21, 184–189, 414, 428, 431, 441, 442, 467; 438/48, 54, 57, 73; 374/100, 120, 159, 208

See application file for complete search history.

(56) References Cited

U.S. PATENT DOCUMENTS
5,793,092 A    8/1998    Habermeier et al.
(Continued)

FOREIGN PATENT DOCUMENTS
JP    8-247851    9/1996
(Continued)

OTHER PUBLICATIONS

Kanno, et al., "Anisotropic thermoelectric properties in layered cobaltite $A_xCoO_2$ (A = Sr and (Currently Amended)) thin film", Applied Physics Letters, vol. 85, No. 5, Aug. 2004, pp. 739-741.

(Continued)

*Primary Examiner* — Que T Le
*Assistant Examiner* — Pascal M Bui Pho
(74) *Attorney, Agent, or Firm* — Hamre, Schumann, Mueller & Larson, P.C.

(57) ABSTRACT

The present invention provides radiation detectors with high detection sensitivity. The radiation detectors according to the present invention each include an $Al_2O_3$ substrate, a $Ca_xCoO_2$ (where $0.15<x<0.55$) thin film that is layered on the $Al_2O_3$ substrate and that has $CoO_2$ planes that are aligned inclined to the surface of the $Al_2O_3$ substrate, a first electrode disposed on the $Ca_xCoO_2$ thin film, and a second electrode disposed on the $Ca_xCoO_2$ thin film in a position opposed to the first electrode in the direction in which the $CoO_2$ planes are aligned inclined. The surface of the $Al_2O_3$ substrate is an n plane or an S plane.

3 Claims, 11 Drawing Sheets

U.S. PATENT DOCUMENTS

| | | | |
|---|---|---|---|
| 5,823,682 A * | 10/1998 | Betz | 374/130 |
| 6,123,026 A * | 9/2000 | Gottlieb | 102/293 |
| 7,067,205 B2 | 6/2006 | Adachi et al. | |
| 7,312,392 B2 | 12/2007 | Yotsuhashi et al. | |
| 2003/0151064 A1 * | 8/2003 | Ohno et al. | 257/192 |
| 2004/0232893 A1 * | 11/2004 | Odagawa et al. | 320/154 |
| 2006/0021646 A1 * | 2/2006 | Yotsuhashi et al. | 136/236.1 |
| 2007/0102034 A1 * | 5/2007 | Kanno et al. | 136/203 |
| 2010/0327165 A1 | 12/2010 | Takahashi et al. | |

FOREIGN PATENT DOCUMENTS

| | | |
|---|---|---|
| JP | 2003-273469 | 9/2003 |
| JP | 2008-028048 | 2/2008 |
| WO | 2005/083808 | 9/2005 |

OTHER PUBLICATIONS

Sakai, et al., "Preparation and Anisotropic Thermoelectric Properties in Misfit Cobaltite Thin Film", 2005 $24^{th}$ International Conference on Thermoelectrics, Jun. 2005, p. 276.

Kwok, et al., "Anomalous photovoltaic response in $YBa_2Cu_3O_7$" Physical Review B, vol. 46, No. 6, Aug. 1992, pp. 3692-3695.

Bdikin, et al., "Growth and domain structure of $YBa_sCu_3O_x$ thin films and $YBa_sCu_3O_7/CeO_2$ heterostructures on tilted $NdGaO_3$ substrates", Physica C, vol. 377, 2002, pp. 26-35.

Lankes, et al., "Large Transverse Seebeck Voltage in Oxygen-reduced $YBa_sCu_3O_7$ and $Y_{1-x}Pr_xBa_2Cu_3O_{7\delta}$ Thin Films", $15^{th}$ International Conference on Thermoelectrics, 1996, pp. 494-498.

* cited by examiner

RADIATION DETECTOR WITH AL2O3 SUBSTRATE AND RADIATION DETECTION METHOD

TECHNICAL FIELD

The present invention relates to a radiation detector that utilizes an anisotropic thermoelectric effect and a radiation detection method using the same.

BACKGROUND ART

When a temperature difference is generated between both ends of a thermoelectric conversion material, an electromotive force (a thermal electromotive force) is generated in proportion to the temperature difference. The phenomenon that thermal energy is converted into electrical energy in a thermoelectric conversion material is known as the Seebeck effect. The electromotive force V that is generated is expressed as $V=S\Delta T$, where $\Delta T$ is a temperature difference and S is the Seebeck coefficient peculiar to the material.

In a thermoelectric conversion material that exhibits isotropic physical properties, the electromotive force generated by the Seebeck effect is generated only in the direction in which the temperature difference has been generated. On the other hand, due to the inclined arrangement of crystal axes, the thermoelectric conversion material that exhibits anisotropy in its electrical transport properties generates an electromotive force in the direction orthogonal to the direction in which the temperature difference has been generated. The electrical transport properties denote the behavior of positive holes and electrons having electric charges that move in a substance. As described above, the phenomenon that due to the inclined arrangement of the crystal axes of the material, an electromotive force is generated in the direction that is different from the direction in which the temperature difference has been generated (a heat flow direction) is referred to as an anisotropic thermoelectric effect or an off-diagonal thermoelectric effect.

FIG. 11 is a diagram of a coordinate system for explaining the anisotropic thermoelectric effect. As shown in FIG. 11, the crystal axes abc of the sample 101 are inclined to the spatial axes xyz. In the sample 101, when a temperature difference $\Delta T_z$ is applied in the direction along the z axis, an electromotive force $V_x$ is generated in the direction orthogonal to the z axis, i.e. the direction along the x axis. The electromotive force $V_x$ is represented by Formula (1):

[Mathematical Formula 1]

$$V_x = \frac{l}{2d}\Delta T_z \cdot \Delta S \cdot \sin 2\alpha \tag{1}$$

where l denotes the width of the sample 101, d denotes the thickness of the sample 101, α denotes the inclination angle of the a-b plane with respect to the surface (the x-y plane) of the sample 101, and $\Delta S$ denotes the difference (the difference that occurs due to anisotropy) between the Seebeck coefficient $S_c$ in the c-axis direction and the Seebeck coefficient $S_{ab}$ in the direction of the a-b in-plane.

Conventionally, a radiation detector using an inclined layered thin film of $YBa_2Cu_3O_{7-d}$ (hereinafter referred to as "YBCO") has been proposed as a radiation detector that utilizes the anisotropic thermoelectric effect (see, for example, Patent Literature 1). The inclined layered thin film denotes a thin film that is layered on a substrate and that has a layered structure in which the crystal axis is inclined to the surface of the substrate and a plurality of inclined layers are layered together. The YBCO thin film has an anisotropic crystal structure in which $CuO_2$ layers having electrical conductivity and Y and BaO layers that have insulation properties are layered alternately along the c-axis direction. When the YBCO thin film is layered (layered inclined) on a suitable substrate surface in such a manner that the c axis is inclined to the substrate surface, a similar system to that shown in FIG. 11 is formed. The $CuO_2$ planes correspond to the a-b planes shown in FIG. 11. When an electromagnetic wave is incident on the surface of the YBCO thin film that has been layered inclined as described above, a temperature difference is generated in the direction perpendicular to the surface of the YBCO thin film. As a result, an electromotive force is generated in the direction parallel to the surface of the YBCO thin film by the anisotropic thermoelectric effect. By reading this electromotive force, the electromagnetic wave that has been incident on the surface of the YBCO thin film can be detected. A radiation detector using the YBCO thin film can detect an electromagnetic wave at a sensitivity of approximately 100 mV/K.

From Formula (1), the electromotive force $V_x$ that is generated by the anisotropic thermoelectric effect is proportional to the difference $\Delta S$ that occurs due to anisotropy of the Seebeck coefficient, the aspect ratio l/d of a sample, and a sine value of sin 2α of an angle that is twice the inclination angle α. In the YBCO thin film, the difference $\Delta S$ is smaller than 10 μV/K, and the upper limit that allows the inclination angle α of the $CuO_2$ planes to be maintained at a single angle is limited to approximately 10 to 20° (see, for example, Non-Patent Literature 1 and Non-Patent Literature 2). Accordingly, the radiation detector that includes the YBCO thin film used therein cannot be said to have sufficiently high sensitivity for being used practically. In order to improve the sensitivity of a radiation detector that includes an inclined layered thin film used therein, there are methods in which, for example, a material with a larger difference $\Delta S$ is used and the inclination angle α of the thin film is brought close to 45 degrees as much as possible. Since the range of the inclination angle α in the inclined layered thin film depends on the combination of the thin film material and the substrate material on which the thin film material is layered, it is preferable that a suitable substrate material be selected so that the inclination angle α can be controlled widely up to around 45°.

Patent Literature 1 discloses a radiation detector in which a YBCO thin film partially doped with Pr is used. According to Patent Literature 1, the radiation detector has a sensitivity approximately twenty times higher than that of a radiation detector with a non-doped YBCO thin film used therein. It is suggested that the reason for this is because the Seebeck coefficient of the YBCO thin film is increased by Pr doping. However, Non-Patent Literature 3 describes that in a YBCO thin film, the Seebeck coefficient increases in the direction of the a-b in-plane through doping with Pr, but the difference $\Delta S$ becomes smaller. Furthermore, Non-Patent Literature 3 describes that the difference $\Delta S$ becomes smaller in the Pr doping range employed for the YBCO thin film used for the radiation detector of Patent Literature 1. Non-Patent Literature 3 describes the result of measurement of the response of the Pr-doped YBCO thin film to light irradiation using light with a wavelength (308 nm) that was different from light with a wavelength of 248 nm used in Patent Literature 1. According to this result, the Pr-doped YBCO thin film had a smaller electromotive force that is generated by the anisotropic thermoelectric effect as compared to a non-doped YBCO thin film. As described in Patent Literature 1, the improvement in sensitivity of the radiation detector with the Pr-doped YBCO thin film used therein is probably attributed to an increase in absorption coefficient of the YBCO thin film with respect to light with a wavelength of 248 nm due to Pr doping. Therefore, although the radiation detector of Patent Literature 1 is highly sensitive to light with a wavelength of 248 nm, it cannot be said that the detection sensitivity is improved in other wavelength ranges.

CITATION LIST

Patent Literature

Patent Literature 1 JP 8 (1996)-247851 A

Non-Patent Literature

Non-Patent Literature 1 H. S. Kwok, J. P. Zheng, "Anomalous photovoltaic response in $YBa_2Cu_3O_7$", The American Physical Society, PHYSICAL REVIEW B, (1992), VOLUME 46, NUMBER 6, 3692
Non-Patent Literature 2 Physica C 377 (2002) 26-35, Elsevier Science B. V.
Non-Patent Literature 3 15th International Conference on Thermoelectrics (1996), IEEE, pp. 494-498

SUMMARY OF INVENTION

Technical Problem

The present invention is made with the above situation in mind and is intended to provide a radiation detector and radiation detection method with higher detection sensitivity.

Solution of Problem

The present inventors made various studies and found that the above-mentioned object was achieved by the following present invention. That is, a radiation detector of the present invention includes an $Al_2O_3$ substrate, a $Ca_xCoO_2$ (where $0.15<x<0.55$) thin film that is layered on the $Al_2O_3$ substrate and that has $CoO_2$ planes that are aligned inclined to the surface of the $Al_2O_3$ substrate, a first electrode disposed on the $Ca_xCoO_2$ thin film, and a second electrode disposed on the $Ca_xCoO_2$ thin film in a position opposed to the first electrode in the direction in which the $CoO_2$ planes are aligned inclined, wherein the surface of the $Al_2O_3$ substrate is an n plane or an S plane.

Furthermore, a radiation detection method of the present invention is a radiation detection method of detecting an electromagnetic wave using a radiation detector, wherein the radiation detector includes an $Al_2O_3$ substrate, a $Ca_xCoO_2$ (where $0.15<x<0.55$) thin film that is layered on the $Al_2O_3$ substrate and that has $CoO_2$ planes that are aligned inclined to the surface of the $Al_2O_3$ substrate, a first electrode disposed on the $Ca_xCoO_2$ thin film, and a second electrode disposed on the $Ca_xCoO_2$ thin film in a position opposed to the first electrode in the direction in which the $CoO_2$ planes are aligned inclined, the surface of the $Al_2O_3$ substrate is an n plane or an S plane, a thermal electromotive force is extracted that is generated between the first electrode and the second electrode according to a temperature difference generated in the $Ca_xCoO_2$ thin film by an electromagnetic wave that is incident on the $Ca_xCoO_2$ thin film, and the electromagnetic wave is detected based on the thermal electromotive force.

The present inventors studied various conditions and optimized them and thereby found that with a laminate having a two-layer structure including a $Ca_xCoO_2$ thin film and an $Al_2O_3$ substrate, it was possible to produce a $Ca_xCoO_2$ thin film with a crystal axis that was inclined considerably to the surface of the $Al_2O_3$ substrate. According to the radiation detector that includes the laminate having a two-layer structure, it is possible to increase the inclination angle of the crystal axis of the $Ca_xCoO_2$ thin film, which is an inclined layered thin film. Therefore, it also is possible to make the inclination angle approach 45°, and thereby the detection sensitivity (an electromotive force) of the radiation detector can be increased.

ADVANTAGEOUS EFFECTS OF INVENTION

The present invention can provide a radiation detector and radiation detection method with higher detection sensitivity.

DESCRIPTION OF EMBODIMENT

Figure 1:
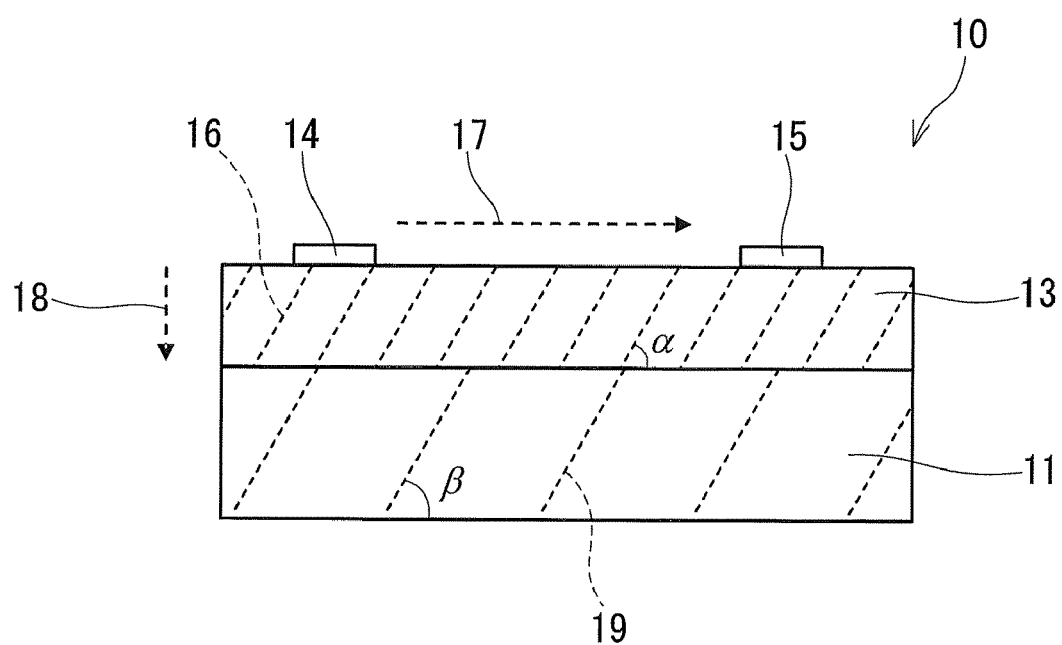
FIG. 1 is a cross-sectional view of an embodiment of a radiation detector according to the present invention.

FIG. 1 is a cross-sectional view of an embodiment of a radiation detector according to the present invention. As shown in FIG. 1, the radiation detector 10 includes an $Al_2O_3$ substrate (a sapphire substrate) 11, a $Ca_xCoO_2$ thin film 13 layered on the $Al_2O_3$ substrate 11 in such a manner as to be in contact with the $Al_2O_3$ substrate 11 as well as a first electrode 14 and a second electrode 15 that are disposed on the $Ca_xCoO_2$ thin film 13. In the $Ca_xCoO_2$ thin film 13, a deviation in composition may occur depending on the production conditions, but it is acceptable as long as x satisfies $0.15<x<0.55$. When x is in this range, $Ca_xCoO_2$ has a stable structure.

The $Ca_xCoO_2$ thin film 13 is an inclined layered thin film and has a layered structure with $CoO_2$ layers and $Ca_x$ block layers that are layered alternately. In the $Ca_xCoO_2$ thin film 13, the Seebeck coefficient $S_{ab}$ in the in-plane direction of the $CoO_2$ planes 16 is different from the Seebeck coefficient $S_c$ in the c-axis direction of the $Ca_xCoO_2$ thin film 13, which is a direction perpendicular to the in-plane direction, and the $Ca_xCoO_2$ thin film 13 exhibits anisotropy.

In the $Ca_xCoO_2$ thin film 13, a plurality of $CoO_2$ planes 16 are inclined to the surface of the $Al_2O_3$ substrate 11 and are arranged in parallel with one another. The second electrode 15 is disposed to be separated from the first electrode 14 in the electromotive-force extracting direction 17. In other words, the electromotive-force extracting direction is a direction in which the first electrode 14 and the second electrode 15 are opposed to each other. The electromotive-force extracting direction 17 is perpendicular to the line formed at an intersection of a $CoO_2$ plane 16 and the surface of the $Ca_xCoO_2$ thin film 13 (the line in the direction perpendicular to the plane of the paper) and parallel with the surface of the $Ca_xCoO_2$ thin film 13 and is a direction in which the $CoO_2$ planes 16 are arranged inclined. The $CoO_2$ planes 16 are inclined at an inclination angle α to the electromotive-force extracting direction 17. Furthermore, the $CoO_2$ planes 16 also are inclined at an inclination angle α to the surface of the $Al_2O_3$ substrate 11.

The radiation detector 10 has a two-layer structure composed of the $Ca_xCoO_2$ thin film 13 and the $Al_2O_3$ substrate 11. With a laminate having the two-layer structure, it is possible to produce an inclined layered thin film (the $Ca_xCoO_2$ thin film 13) with a structure in which the crystal axis is inclined considerably to the surface of the $Al_2O_3$ substrate 11. Therefore, the inclination angle α can be larger than that of the inclined layered thin film of a conventional radiation detector. In the radiation detector 10, the inclination angle α can be 10° to 80° and is preferably 20° to 70°. This allows a radiation detector 10 with high detection sensitivity to be obtained. As also is understood from Formula (1), it is particularly preferable that the inclination angle α be 45° in the radiation detector 10. In the radiation detector 10, the inclination angle α is allowed to approach 45° further.

In the radiation detector 10, when an electromagnetic wave is incident on the $Ca_xCoO_2$ thin film 13, the electromagnetic wave is absorbed by the $Ca_xCoO_2$ thin film 13. This generates a temperature gradient in the thin-film interplanar direction (thickness direction) 18 in the $Ca_xCoO_2$ thin film 13. The thin-film interplanar direction 18 is perpendicular to the surface of the $Ca_xCoO_2$ thin film 13 and orthogonal to the electromotive-force extracting direction 17. A temperature difference is generated in the $Ca_xCoO_2$ thin film 13 and thereby an electromotive force is generated in the electromotive-force extracting direction 17 in the $Ca_xCoO_2$ thin film 13 by the anisotropic thermoelectric effect. The electromotive force thus generated is output to the outside through the first electrode 14 and the second electrode 15. The electromotive force output to the outside is detected and thereby the electromagnetic wave that has been incident on the $Ca_xCoO_2$ thin film 13 can be detected.

The radiation detector 10 of the present invention can be produced by layering the $Ca_xCoO_2$ thin film 13 on the $Al_2O_3$ substrate 11 and placing the first electrode 14 and the second electrode 15 on the $Ca_xCoO_2$ thin film 13. The method of layering the $Ca_xCoO_2$ thin film 13 is not particularly limited. Various methods can be used including, for example, those using vapor phase growth, such as a sputtering method, a vapor deposition method, a laser ablation method, and a chemical vapor deposition method, or those using growth from a liquid phase. The thickness of the $Ca_xCoO_2$ thin film 13 is not particularly limited as long as it is equal to or more than that of a unit cell layer. Specifically, it is 100 to 200 nm. However, there is no problem even if the thickness is out of this range.

The inclination angle α of the $CoO_2$ planes 16 in the $Ca_xCoO_2$ thin film 13 is determined by the value of the inclination angle β of (0001) planes 19 in the $Al_2O_3$ substrate 11 with respect to the surface of the $Al_2O_3$ substrate 11. Accordingly, in producing the radiation detector 10, the $Al_2O_3$ substrate 11 having an inclination angle β corresponding to a desired value of the inclination angle α can be used. For example, preferably, the $Al_2O_3$ substrate 11 whose surface is an n plane or an S plane is used. In this case, the n plane is, for example, a (11-23) plane and the S plane is, for example, a (10-11) plane. In this case, the inclination angle α is a value of approximately β±10° but the value of the inclination angle α also may vary out of this range according to the production conditions.

The first electrode 14 and the second electrode 15 are not particularly limited as long as they are formed of materials with a high electrical conductivity. Specifically, a metal such as Cu, Ag, Mo, Al, Ti, Cr, Au, Pt, or In, a nitride such as TiN, or an oxide such as indium tin oxide (ITO) or $SnO_2$ can be used. Furthermore, a solder or a conductive paste may be used to produce the first and second electrodes 14 and 15. The method of producing the first and second electrodes 14 and 15 on the $Ca_xCoO_2$ thin film 13 also is not particularly limited. Various methods such as application of a conductive paste, plating, thermal spraying, and bonding with a solder can be used in addition to those using, for example, vapor phase growth, such as a vapor deposition method and a sputtering method. The constituent material for the first electrode 14 and the second electrode 15 is preferably Cu, Ag, Au, or Al, more preferably Cu, Ag, or Au, and particularly preferably Cu or Ag.

The method of producing the radiation detector 10 is not particularly limited to the above-mentioned methods as long as it is a method that can provide a two-layer structure composed of the $Al_2O_3$ substrate 11 and the $Ca_xCoO_2$ thin film 13 and that can place the first and second electrodes 14 and 15 on the $Ca_xCoO_2$ thin film 13.

With respect to the radiation detector 10, the inclination angle α can be controlled by controlling the inclination angle β of the (0001) planes 19 in the $Al_2O_3$ substrate 11 during the production thereof. Therefore, the inclination angle α can be controlled in a wide range. This makes it possible to obtain an inclination angle of the $CoO_2$ planes 16 that greatly exceeds the inclination angle of the $CuO_2$ planes in a conventional YBCO thin film, in the $Ca_xCoO_2$ thin film 13 having a difference ΔS approximately four times as large as that of the conventional YBCO thin film. Accordingly, it is possible to obtain a radiation detector whose performance greatly exceeds that of a conventional radiation detector with an inclined layered thin film used therein. The present invention promotes application of energy conversion between heat and electricity and therefore has a high industrial value.

Although the $Ca_xCoO_2$ thin film was used as the inclined layered thin film, it is expected that the same effect is obtained even when a $Sr_xCoO_2$ thin film is used instead thereof.

Examples

Hereinafter, further specific examples of the present invention are described.

A $Ca_xCoO_2$ thin film was layered on an $Al_2O_3$-n plane substrate whose surface was an n plane (a (11-23) plane) inclined at 61° to a (0001) plane. Thus a laminate with a two-layer structure was produced. Hereinafter, the $Ca_xCoO_2$ thin film in this laminate is described as a "$Ca_xCoO_2/Al_2O_3$-n thin film". In this case, the inclination angle β of the $Al_2O_3$-n plane substrate is 61°.

Furthermore, a $Ca_xCoO_2$ thin film was layered on an $Al_2O_3$—S plane substrate whose surface was an S plane (a (10-11) plane) inclined at 72° to a (0001) plane. Thus a laminate with a two-layer structure was produced. Hereinafter, the $Ca_xCoO_2$ thin film in this laminate is described as a "$Ca_xCoO_2/Al_2O_3$—S thin film". In this case, the inclination angle β of the $Al_2O_3$—S plane substrate is 72°. In producing thin films, radio-frequency (RF) magnetron sputtering was used in all cases.

For production of the $Ca_xCoO_2$ thin film (with a thickness of 150 nm), a target was used in which Ca and Co were mixed together in such a manner as to have a molar ratio of 1:1. After the inside of a film forming chamber was evacuated to $1.0 \times 10^{-3}$ Pa or lower, the $Al_2O_3$-n plane substrate was heated with a resistance heater while a mixed gas of argon (96%) and oxygen (4%) was introduced. In order to select optimum conditions for producing the $Ca_xCoO_2$ thin film, the temperature of the $Al_2O_3$-n plane substrate was varied from 400 to 600° C., with the gas pressure being fixed at 5 Pa, as the film forming conditions. The RF power used during sputtering was fixed at 100 W. After deposition of the thin film, the mixed gas of argon (96%) and oxygen (4%) was introduced. While the gas pressure inside the chamber was maintained at 5 Pa, it was cooled to room temperature over 60 minutes. In the same manner, a $Ca_xCoO_2$ thin film (with a thickness of 150 nm) also was produced on the $Al_2O_3$—S plane substrate. The cation composition ratios of the $Ca_xCoO_2/Al_2O_3$-n thin film and the $Ca_xCoO_2/Al_2O_3$—S thin film thus produced were evaluated with an energy dispersive x-ray spectrometer. As a result, the composition ratio of Ca and Co was approximately 1:2 in both cases. Accordingly, $x \approx 0.5$.

In order to confirm the inclined layered structures of the $CoO_2$ planes in the $Ca_xCoO_2/Al_2O_3$-n thin film and the $Ca_xCoO_2/Al_2O_3$—S thin film, the XRD pole figure measurement was carried out with respect to each of them. The pole figure measurement can provide information regarding the inclination of specific crystal planes to a substrate surface or the alignment direction thereof. With respect to the measurement conditions, the X-ray incident and detection angles (θ-2θ) are fixed at angles that satisfy the Bragg conditions, in the arrangement where crystal planes to be measured are in parallel with a horizontal plane. In this state, the substrate plane is inclined (ψ=0 to 90° from the horizontal direction and further is rotated (ϕ=0 to 360° in the in-plane direction. The scattering X-rays to be detected are reinforced by each other only when the target crystal planes are in parallel with the horizontal plane. The inclination angle (the value of ψ) and the alignment direction (the value of ϕ) of the crystal planes can be obtained through the measurement of intensity distribution of scattering light that is detected, with ψ and ϕ being varied.

Figure 2:
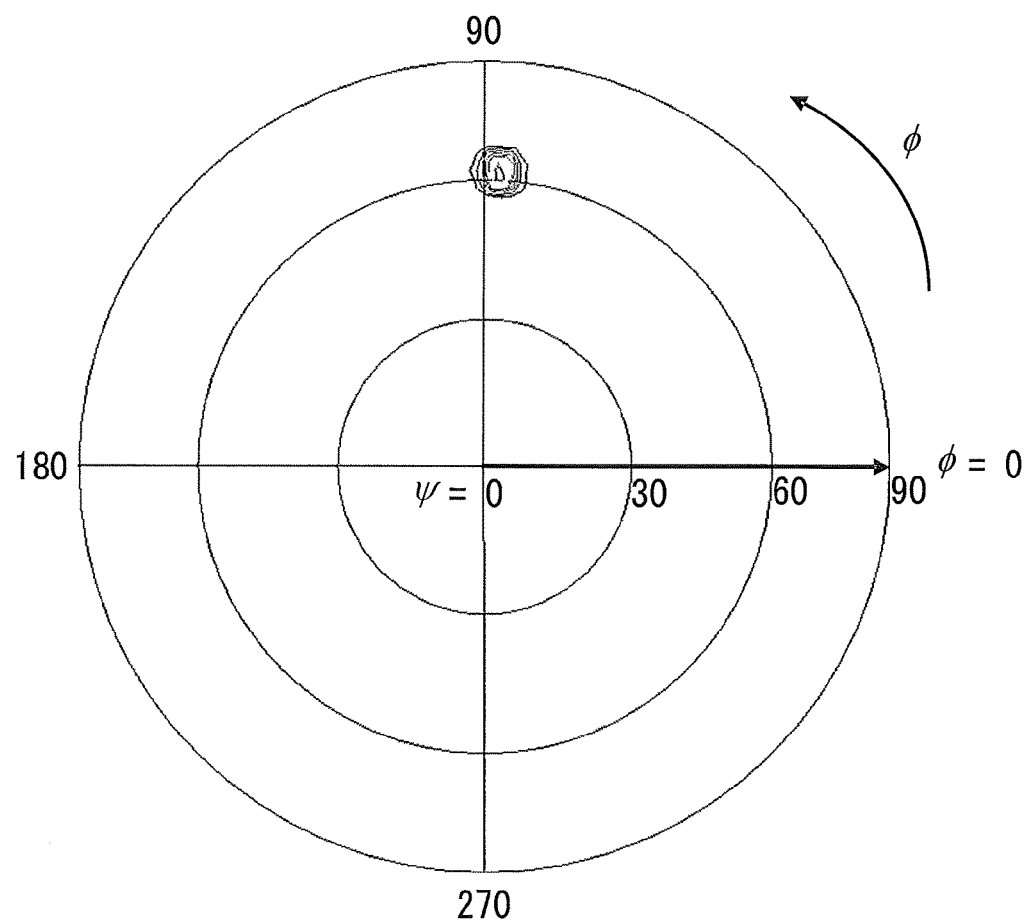
FIG. 2 is a diagram showing the pole figure of a $Ca_xCoO_2/Al_2O_3$-n thin film.

FIG. 2 shows the pole figure obtained through measurement that was carried out, with 2θ being fixed at an angle at which a (001) diffraction peak of the $Ca_xCoO_2/Al_2O_3$-n thin film appears. In this case, the (001) planes of the $Ca_xCoO_2/Al_2O_3$-n thin film correspond to the $CoO_2$ planes. As shown in FIG. 2, one diffraction peak having the maximum value at ψ≈62° and ϕ≈90° has appeared. This indicates that the $CoO_2$ planes are layered inclined at 62° to the surface of the $Al_2O_3$-n plane substrate. Therefore, the inclination angle α is approximately 62°.

Figure 3:
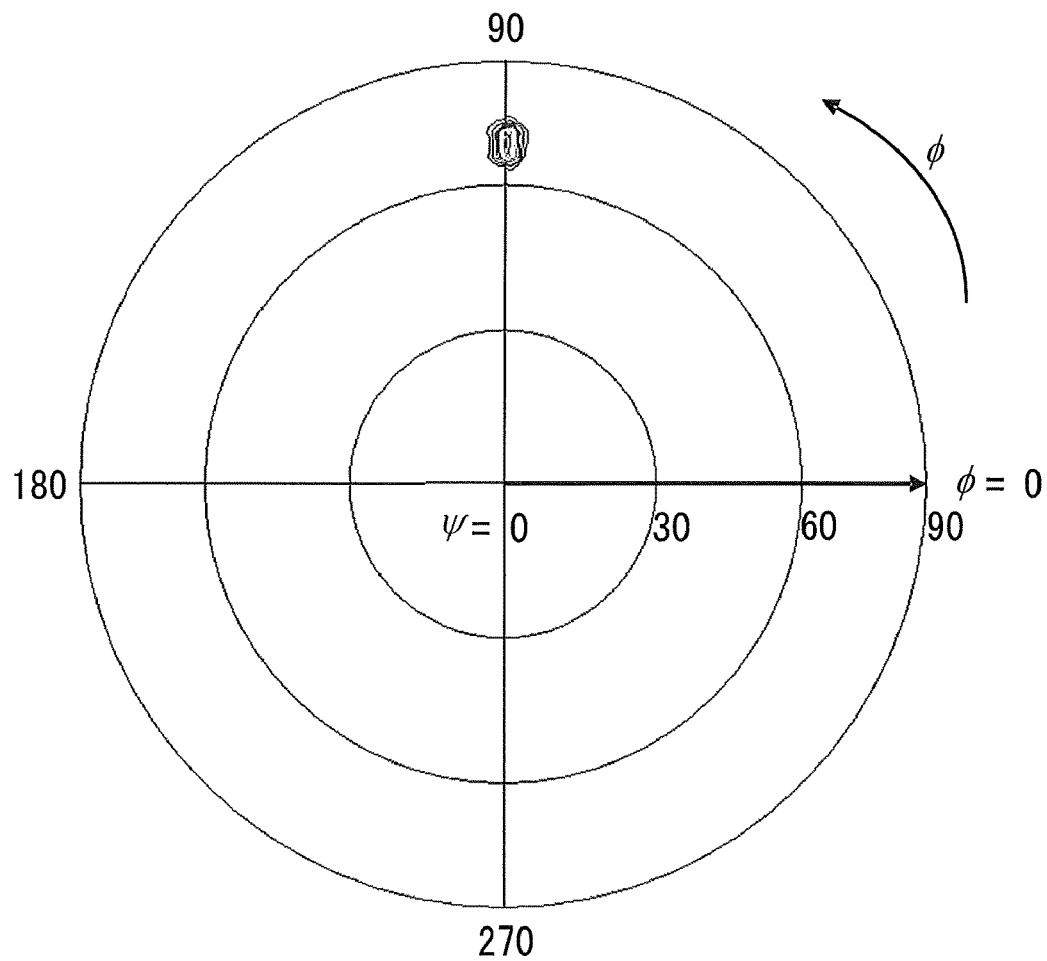
FIG. 3 is a diagram showing the pole figure of a $Ca_xCoO_2/Al_2O_3$—S thin film.

FIG. 3 shows the pole figure of the $Ca_xCoO_2/Al_2O_3$—S thin film obtained through measurement that was carried out in the same manner. As shown in FIG. 3, one diffraction peak having the maximum value at ψ≈70° and ϕ≈90° has appeared. This indicates that the $CoO_2$ planes are layered inclined at 70° to the surface of the $Al_2O_3$—S plane substrate. Therefore, the inclination angle α is approximately 70°. Only one diffraction peak observed in each of FIGS. 2 and 3 indicates that the $CoO_2$ planes were layered and inclined in a single direction in the $Ca_xCoO_2/Al_2O_3$-n thin film and the $Ca_xCoO_2/Al_2O_3$—S thin film.

Figure 4:
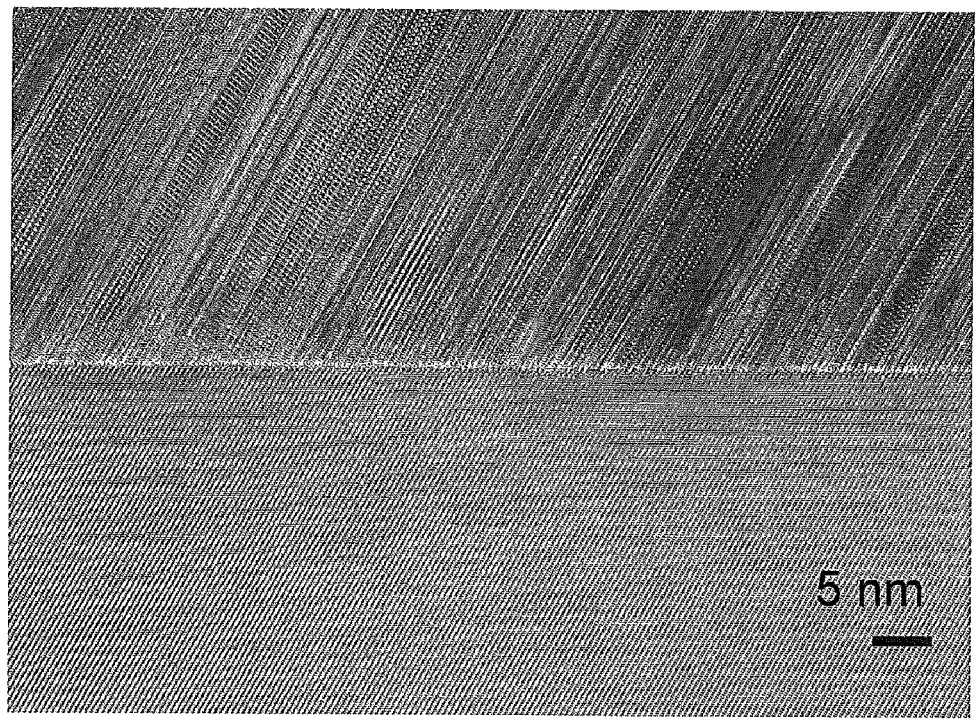
FIG. 4 is a cross-sectional image of the two layers of a $Ca_xCoO_2/Al_2O_3$-n laminate.
Figure 5:
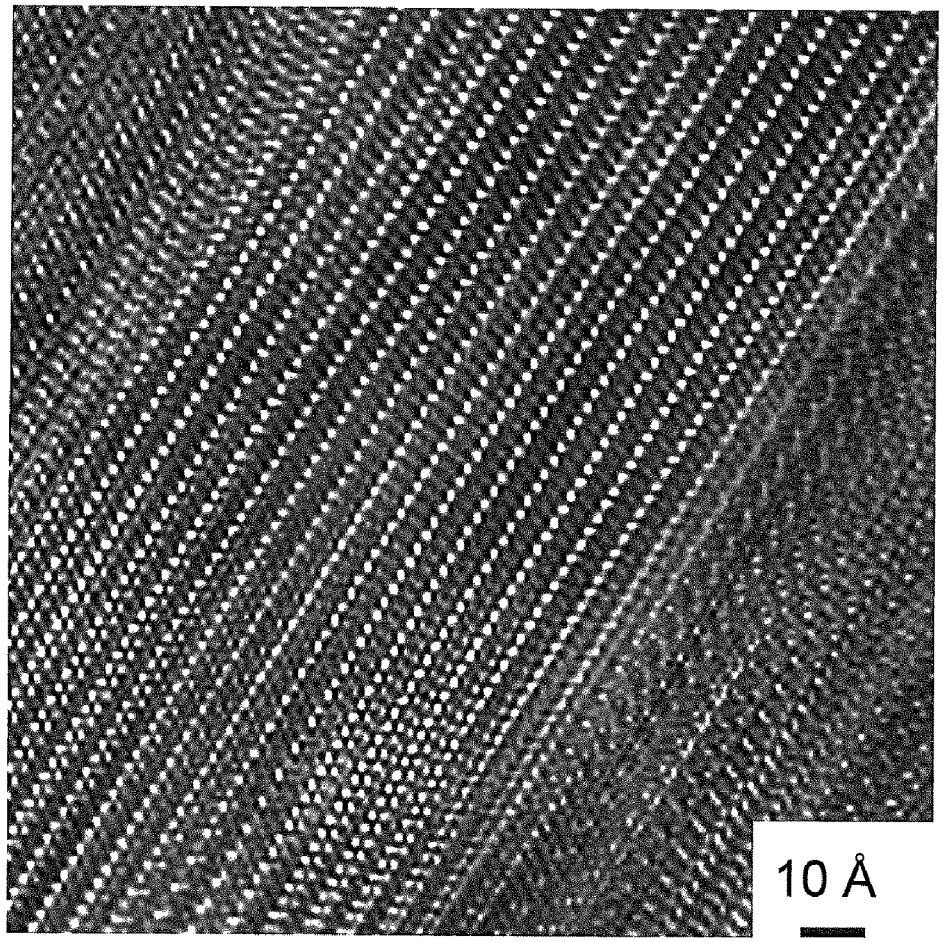
FIG. 5 is a high-resolution image of the inside of the $Ca_xCoO_2/Al_2O_3$-n thin film.
Figure 6:
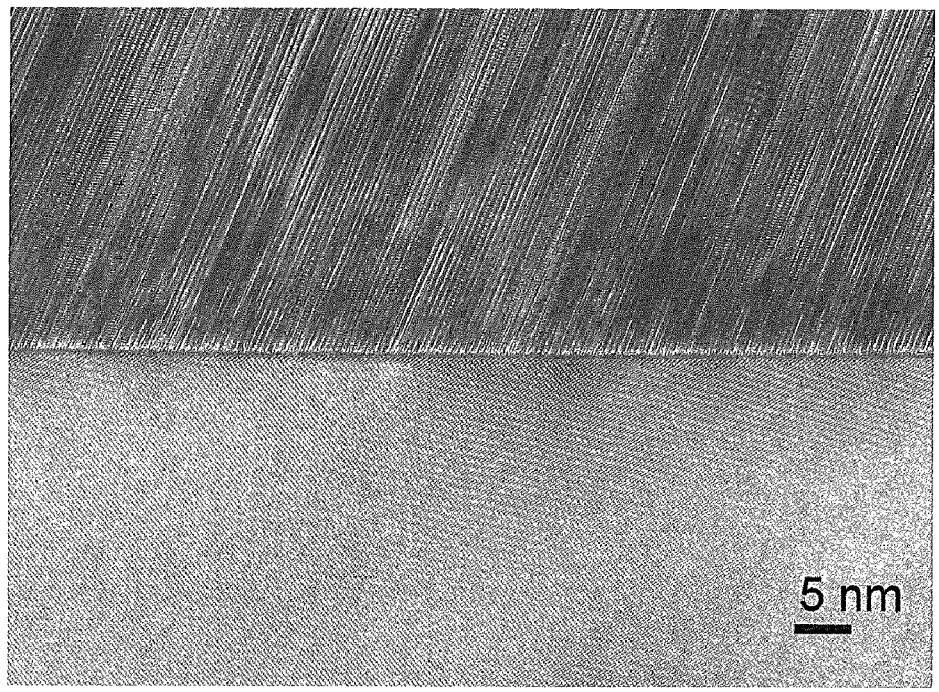
FIG. 6 is a cross-sectional image of the two layers of a $Ca_xCoO_2/Al_2O_3$—S laminate.
Figure 7:
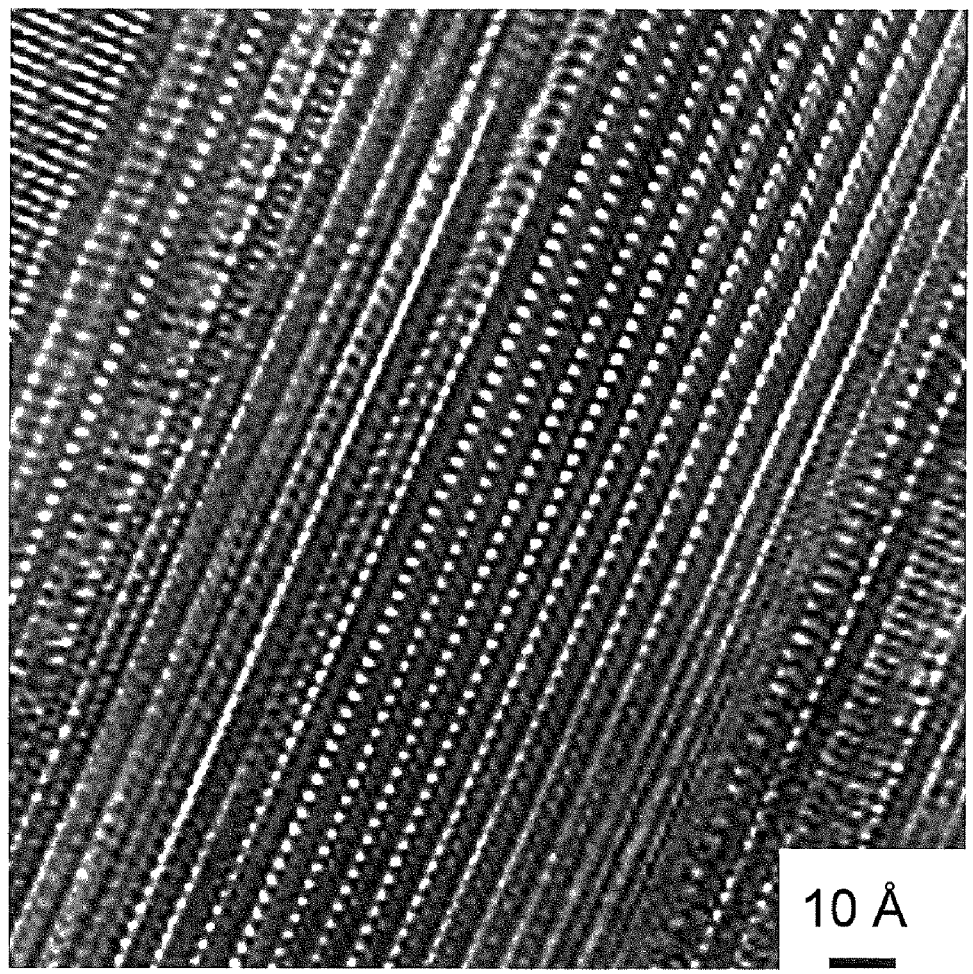
FIG. 7 is a high-resolution image of the inside of the $Ca_xCoO_2/Al_2O_3$—S thin film.

In order further to check the inclined layered structure of the $CoO_2$ planes in the $Ca_xCoO_2/Al_2O_3$-n thin film and the $Ca_xCoO_2/Al_2O_3$—S thin film, they were evaluated with a cross-sectional transmission electron microscope. FIG. 4 is a cross-sectional image of the two layers of the $Ca_xCoO_2/Al_2O_3$-n laminate and FIG. 5 is a high-resolution image of the inside of the $Ca_xCoO_2/Al_2O_3$-n thin film. FIG. 6 is a cross-sectional image of the two layers of the $Ca_xCoO_2/Al_2O_3$—S laminate and FIG. 7 is a high-resolution image of the inside of the $Ca_xCoO_2/Al_2O_3$—S thin film.

As shown in FIGS. 4 to 7, a uniform stripe structure was observed clearly in each of the $Ca_xCoO_2/Al_2O_3$-n thin film and the $Ca_xCoO_2/Al_2O_3$—S thin film. The stripe structure is inclined to the surface of each of the $Al_2O_3$-n plane substrate and the $Al_2O_3$—S plane substrate, and the inclination angles coincide with the inclination angles α of the $CoO_2$ planes calculated according to the respective pole figures. Furthermore, the intervals of the stripes coincide with the grid interval (5 Å (angstrom)) of the $CoO_2$ planes in $Ca_xCoO_2$. From above, it was confirmed that the $Ca_xCoO_2$ thin film was layered on the $Al_2O_3$ substrate, with the (0001) plane being inclined to the surface, so that a $Ca_xCoO_2$ thin film was formed actually, with the $CoO_2$ planes being layered and inclined with respect to the surface of the $Al_2O_3$ substrate.

Figure 8:
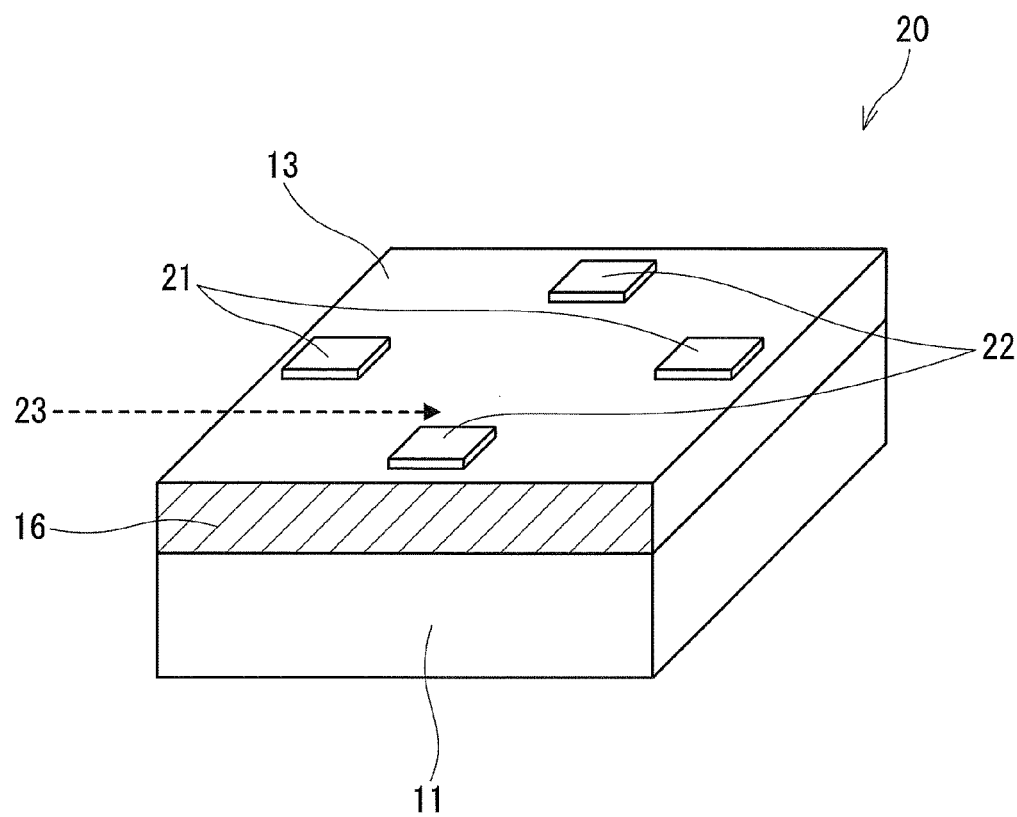
FIG. 8 is a perspective view showing the configuration of a radiation detector for measuring an electromotive force.

FIG. 8 is a perspective view showing the configuration of a radiation detector for measuring an electromotive force. As shown in FIG. 8, the radiation detector 20 includes an $Al_2O_3$ substrate 11 and a $Ca_xCoO_2$ thin film 13 that is layered on the $Al_2O_3$ substrate 11 as well as a first electrode pair 21 and a second electrode pair 22 that are placed on the $Ca_xCoO_2$ thin film 13. The first electrode pair 21 is a pair of electrodes disposed to be separated from each other along the inclined alignment direction 23 of $CoO_2$ planes 16. The second electrode pair 22 is a pair of electrodes disposed to be separated from each other along the direction perpendicular to the inclined alignment direction 23. The inclined alignment direction 23 is identical to the electromotive-force extracting direction. The first electrode pair 21 and the second electrode pair 22 are disposed in such a manner that the intersection of the line segment extending between the respective electrodes of the first electrode pair 21 and the line segment extending between the respective electrodes of the second electrode pair 22 is the center position of each line segment. The second electrode pair 22 is used for checking whether an electromotive force is generated in the direction perpendicular to the inclined alignment direction 23. Therefore, it does not need to be disposed in an actual radiation detector.

Radiation detectors with the configuration shown in FIG. 8 were produced using a $Ca_xCoO_2/Al_2O_3$-n thin film and a $Ca_xCoO_2/Al_2O_3$—S thin film, respectively. The first electrode pair and the second electrode pair each were composed of Au and were formed on the surface of the $Ca_xCoO_2$ thin film by the vacuum vapor deposition method. In each electrode pair, the width between the respective electrodes was set at 6 mm. In an actual radiation detector, the width between the electrodes is not limited to 6 mm and can be optimized suitably according to the intended use and the installation location.

Figure 9:
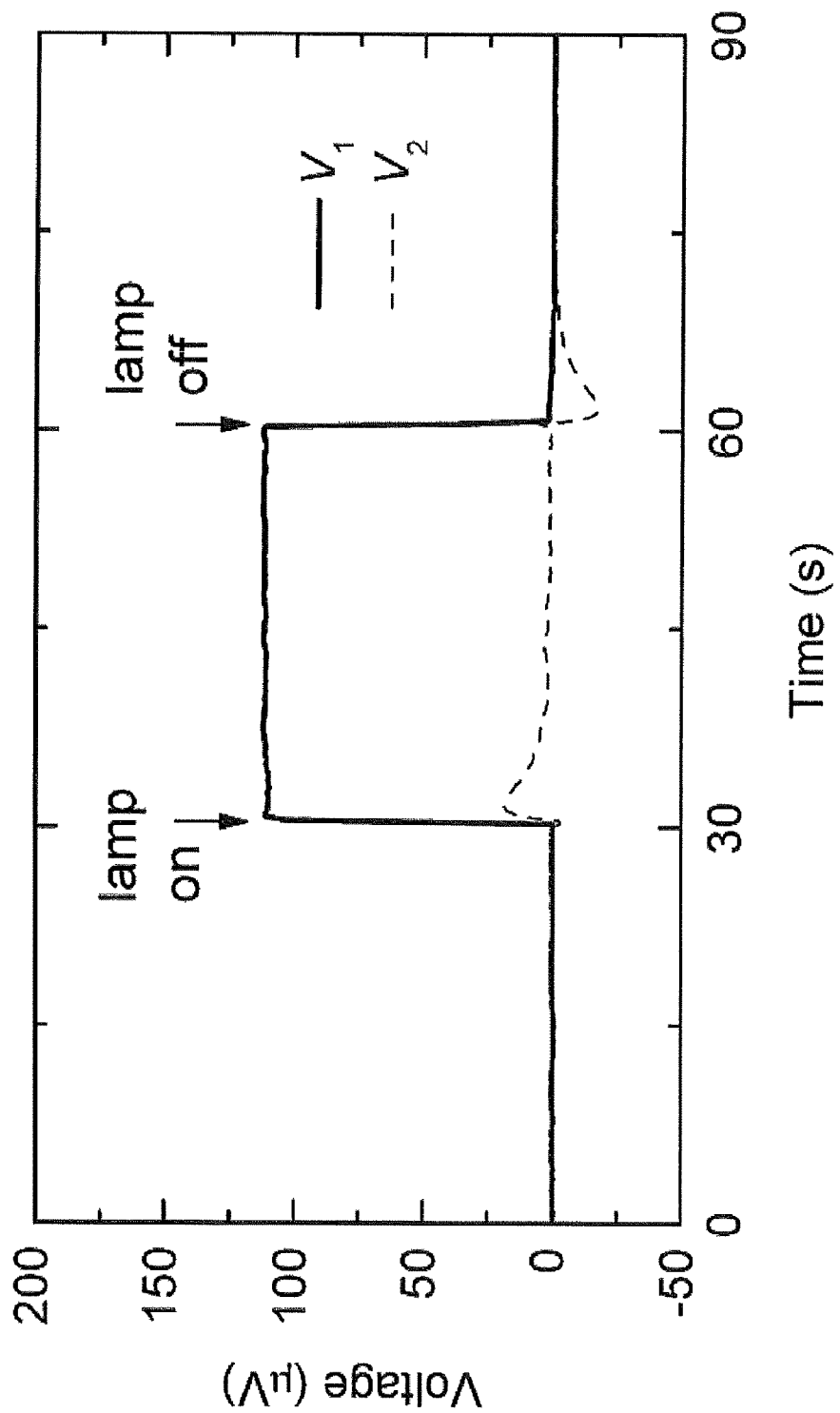
FIG. 9 is a graph showing change of electromotive force with time according to incidence and cutoff of an electromagnetic wave in a radiation detector with a $Ca_xCoO_2/Al_2O_3$-n thin film used therein.

An electromagnetic wave generated from an infrared lamp (with a wavelength of 800 to 2000 nm) was allowed to be incident on the surface of each radiation detector that had been produced, in such a manner that the spot diameter was 8 mm. Specifically, an electromagnetic wave at 480 mW was output from the infrared lamp and was allowed to be incident on the center of the surface of the $Ca_xCoO_2$ thin film, and then the electromotive force $V_1$ generated in the inclined alignment direction and the electromotive force $V_2$ generated in the direction perpendicular to the inclined alignment direction were measured. FIG. 9 shows a graph indicating change of electromotive force with time according to incidence and cutoff of an electromagnetic wave in the radiation detector with the $Ca_xCoO_2/Al_2O_3$-n thin film used therein. As shown in FIG. 9, when the electromagnetic wave output from the infrared lamp was not incident on the radiation detector with the $Ca_xCoO_2/Al_2O_3$-n thin film used therein, the electromotive forces $V_1$ and $V_2$ were not generated. When the infrared lamp was turned on and an electromagnetic wave was allowed to be incident thereon, the electromotive force $V_1$ increased rapidly and a value of approximately 112 μV was indicated steadily. On the other hand, the electromotive force $V_2$ did not show a notable change. Thereafter, when the infrared lamp was turned off and thereby the electromagnetic wave was cutoff, the electromotive force $V_1$ decreased rapidly to return to zero. On the other hand, the electromotive force $V_2$ did not show a notable change.

Figure 10:
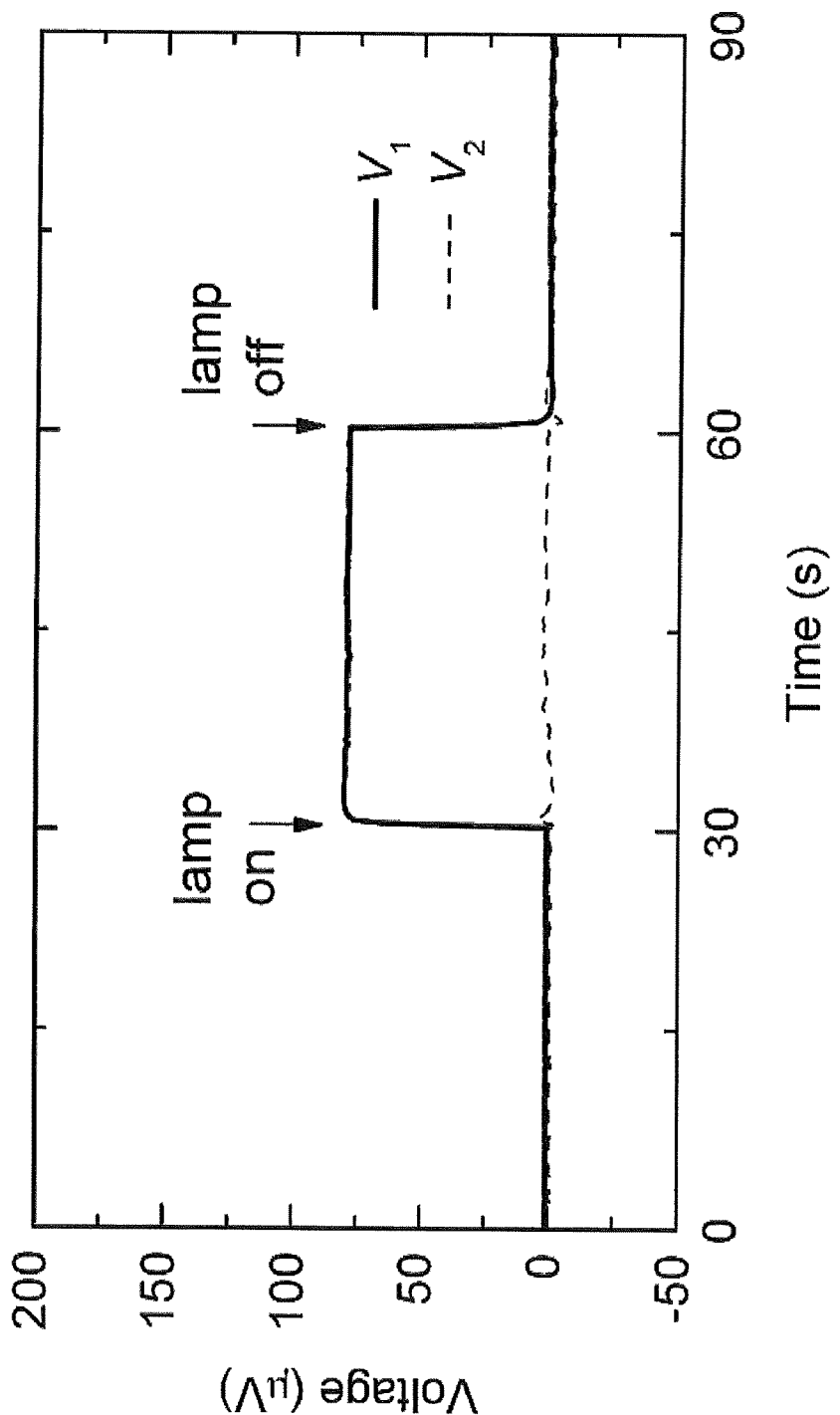
FIG. 10 is a graph showing change of electromotive force with time according to incidence and cutoff of an electromagnetic wave in a radiation detector with a $Ca_xCoO_2/Al_2O_3$—S thin film used therein.
Figure 11:
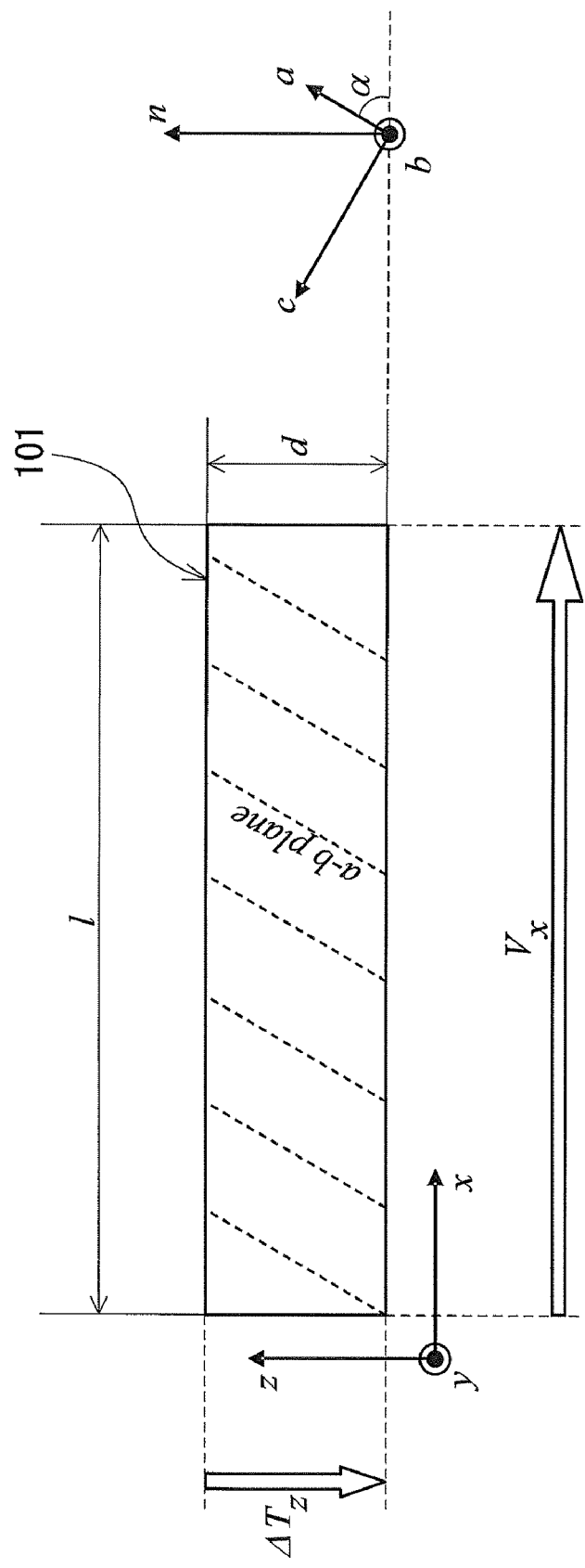
FIG. 11 is a diagram of a coordinate system for explaining the anisotropic thermoelectric effect.

FIG. 10 shows a graph indicating change of electromotive force with time according to incidence and cutoff of an electromagnetic wave in the radiation detector with the $Ca_xCoO_2/Al_2O_3$—S thin film used therein. As shown in FIG. 10, when the electromagnetic wave output from the infrared lamp was not incident on the radiation detector with the $Ca_xCoO_2/Al_2O_3$—S thin film used therein, the electromotive forces $V_1$ and $V_2$ were not generated. When the infrared lamp was turned on and an electromagnetic wave was allowed to be incident thereon, the electromotive force $V_1$ increased rapidly and a value of approximately 90 μV was indicated steadily. On the other hand, the electromotive force $V_2$ did not show a notable change. Thereafter, when the infrared lamp was turned off and thereby the electromagnetic wave was cutoff, the electromotive force $V_1$ decreased rapidly to return to zero. On the other hand, the electromotive force $V_2$ did not show a notable change. As can be understood from FIGS. 9 and 10, the direction in which an electromotive force is generated in the radiation detectors is the inclined alignment direction alone. Since the direction in which an electromotive force is generated depends on the inclined alignment direction of the $CoO_2$ planes, it can be understood that generation of the electromotive force $V_1$ results from the anisotropic thermoelectric effect.

The temperature difference $\Delta T_z$ that is generated between the upper and lower surfaces of each of the $Ca_xCoO_2/Al_2O_3$-n thin film and the $Ca_xCoO_2/Al_2O_3$—S thin film of the radiation detectors is estimated to be approximately 0.25 mK from Formula (1). The respective values in Formula (1) are as follows: $\Delta S = 35$ μV/K, $d = 150$ nm, and $l = 6$ mm. As described above, the respective radiation detectors have an electromotive force $V_x$ of 112 μV and 90 μV and an inclination angle α of 62° and 70°, respectively.

Therefore, the detection sensitivity in the inclined alignment direction reaches 450 mV/K and 360 mV/K in the respective radiation detectors. These are approximately 4.5 times and approximately 3.6 times as high as the detection sensitivity (100 mV/K) of a radiation detector that includes a conventional YBCO inclined layered thin film used therein.

INDUSTRIAL APPLICABILITY

The radiation detectors according to the present invention have excellent radiation detection properties and can be used for detection of various objects involving irradiation of an electromagnetic wave in, for example, a temperature sensor and a laser beam power meter.

The invention claimed is:
1. A radiation detector, comprising:
   an $Al_2O_3$ substrate;
   a $Ca_xCoO_2$ (where $0.15 < x < 0.55$) thin film that is layered on a surface of the $Al_2O_3$ substrate and that has $CoO_2$ planes that are aligned inclined to the surface of the $Al_2O_3$ substrate, the surface of the $Al_2O_3$ substrate being an n-plane or an s-plane;
   a first electrode disposed on the $Ca_xCoO_2$ thin film; and
   a second electrode disposed on the $Ca_xCoO_2$ thin film in a position opposed to the first electrode in the direction in which the $CoO_2$ planes are aligned inclined.
2. The radiation detector according to claim 1, wherein the first electrode and the second electrode are composed of Cu, Ag, Au, or Al.
3. A radiation detection method, comprising: detecting an electromagnetic wave using a radiation detector, wherein the radiation detector comprises an $Al_2O_3$ substrate, a $Ca_xCoO_2$ (where $0.15 < x < 0.55$) thin film that is layered on a surface of the $Al_2O_3$ substrate and that has $CoO_2$ planes that are aligned inclined to the surface of the $Al_2O_3$ substrate, a first electrode disposed on the $Ca_xCoO_2$ thin film, and a second electrode disposed on the $Ca_xCoO_2$ thin film in a position opposed to the first electrode in the direction in which the $CoO_2$ planes are aligned inclined, the surface of the $Al_2O_3$ substrate being an n-plane or an s-plane; and
   extracting a thermal electromotive force generated between the first electrode and the second electrode according to a temperature difference generated in the $Ca_xCoO_2$ thin film by an electromagnetic wave that is incident on the $Ca_xCoO_2$ thin film to detect the electromagnetic wave based on the thermal electromotive force.

* * * * *